United States Patent
Hamrock et al.

(10) Patent No.: US 6,277,512 B1
(45) Date of Patent: Aug. 21, 2001

(54) POLYMER ELECTROLYTE MEMBRANES FROM MIXED DISPERSIONS

(75) Inventors: Steven Joseph Hamrock, Saint Paul; David Adrian Ylitalo, Stillwater, both of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/336,203

(22) Filed: Jun. 18, 1999

(51) Int. Cl.$^7$ .......................... H01M 8/10; H01M 10/40
(52) U.S. Cl. ................. 429/33; 429/309; 521/27
(58) Field of Search ............... 429/33, 309, 314, 429/316, 317; 521/27

(56) References Cited

U.S. PATENT DOCUMENTS

| | | | |
|---|---|---|---|
| 4,116,889 | 9/1978 | Chlanda et al. | 521/27 |
| 4,176,215 | 11/1979 | Molnar et al. | 521/27 |
| 4,377,481 | 3/1983 | Jakabhazy | 210/500.2 |
| 4,556,614 | * 12/1985 | Le Méhauté et al. | |
| 4,591,439 | 5/1986 | Grot | 210/638 |
| 4,708,981 | 11/1987 | Zupancic et al. | 525/59 |
| 4,734,343 | 3/1988 | Berthier et al. | 429/192 |
| 4,761,233 | 8/1988 | Linder et al. | 210/500.37 |
| 4,810,384 | 3/1989 | Fabre | 210/500.23 |
| 5,105,047 | 4/1992 | Waller | 585/515 |
| 5,114,515 | 5/1992 | Birdwell et al. | |
| 5,118,869 | 6/1992 | Dorai et al. | 568/617 |
| 5,447,636 | 9/1995 | Banerjee | |
| 5,510,394 | 4/1996 | Hodgdon | 521/27 |
| 5,547,551 | 8/1996 | Bahar et al. | 204/296 |
| 5,599,614 | 2/1997 | Bahar et al. | |
| 5,641,859 | 6/1997 | Chen et al. | 528/422 |
| 5,705,084 | * 1/1998 | Kejha | |
| 5,741,611 | * 4/1998 | Fleisher et al. | |
| 5,756,230 | * 5/1998 | Gao et al. | |
| 5,814,405 | 9/1998 | Branca et al. | |
| 5,834,523 | 11/1998 | Steck et al. | |
| 5,876,571 | 3/1999 | Buck | 204/157.15 |
| 5,879,828 | 3/1999 | Debe et al. | |
| 5,910,532 | 6/1999 | Schmidt et al. | 524/556 |
| 5,932,511 | 8/1999 | Harmer et al. | |
| 5,948,946 | 9/1999 | Harmer et al. | |
| 5,985,942 | 11/1999 | Steck et al. | |

FOREIGN PATENT DOCUMENTS

| | | |
|---|---|---|
| 0 094 679 B1 | 11/1983 | (EP) . |
| 0 345 964 A1 | 12/1989 | (EP) . |
| 0 766 329 A1 | 4/1997 | (EP) . |
| WO 97/24777 | 7/1997 | (WO) . |
| WO 98/51733 | 11/1998 | (WO) . |
| WO 99/19930 | 4/1999 | (WO) . |

OTHER PUBLICATIONS

*Resin blends for ion exchanger membranes*, Chem Abstracts 99(26), Dec. 26, 1983, p. 57, Abstract #99:213718W.

* cited by examiner

Primary Examiner—Stephen Kalafut
(74) Attorney, Agent, or Firm—Philip Y. Dahl

(57) ABSTRACT

A polymer electrolyte membrane is provided comprising an intimate mixture of an ionomeric polymer and a structural film-forming polymer. A method of making the polymer electrolyte membrane is also provided, comprising the step of coalescing at least one of an ionomeric polymer and a structural film-forming polymer in a mixture of the two resulting from a mixed dispersion and optionally crosslinking one or both.

24 Claims, No Drawings

POLYMER ELECTROLYTE MEMBRANES FROM MIXED DISPERSIONS

FIELD OF THE INVENTION

This invention relates to ion conducting polymer electrolyte membranes (PEMs) comprising an intimate mixture of an ionomeric polymer and a structural film-forming polymer and methods of producing such membranes from mixed dispersions of the polymeric components.

BACKGROUND OF THE INVENTION

Electrochemical devices, including proton exchange membrane fuel cells, sensors, electrolyzers, chlor-alkali separation membranes, and the like, are typically constructed from a basic unit called a membrane electrode assembly (MEA). In an MEA of a typical electrochemical cell, an ion conducting polymer electrolyte membrane (PEM) is in contact with a cathode and an anode, and transports ions that are formed at the anode to the cathode, allowing current to flow in an external circuit connecting the electrodes. The PEM is a solid electrolyte which must conduct the appropriate ions and should not conduct electrons or allow passage of reactant gasses. In addition, the PEM should have the necessary structural strength under operating conditions.

Commonly used PEM materials include Nafion™ polymers (DuPont Chemicals, Inc., Wilmington, Del., available from ElectroChem, Inc., Woburn, Mass., and Aldrich Chemical Co., Inc., Milwaukee, Wis.) which are perfluorocarbon polymers having attached $-SO_3^-$ anion groups. However, membranes of Nafion alone are inherently weak, especially as the level of hydration increases. Higher strength may be achieved by increasing the thickness of the membrane or by raising the equivalent weight, but at the cost of higher ionic resistance.

One means of constructing a reinforced membrane is to imbibe or infuse an ion-conductive material into a porous inert reinforcing membrane to make a composite membrane. U.S. Pat. No. 5,547,551 (W. L. Gore & Associates, Inc.) describes a composite PEM composed of a porous membrane of polytetrafluoroethylene (PTFE) whose pores are fully impregnated with Nafion™ ionomer. Such composite membranes may exhibit separation between the ionomer and the material of the membrane, especially after repeated hydration or heating, and may then develop gaps.

European Patent No. 0,094,679 (Asahi Glass Co. Ltd.) discloses a PEM made by mixing fibrils such as PTFE fibrils into a fluorinated ion exchange resin, extruding the resin as a membrane, cooling the membrane and then stretching it at a specified reduced temperature.

SUMMARY OF THE INVENTION

Briefly, the present invention provides ion conducting polymer electrolyte membranes (PEMs) comprising an intimate mixture of an ionomeric polymer and a structural film-forming polymer.

In another aspect, the present invention provides methods of producing PEMs by providing a mixture of at least one ionomeric polymer and at least one structural film-forming polymer; and coalescing at least one of said polymers. Furthermore, one or both polymers may be crosslinked.

What has not been described in the art, and is provided by the present invention, is a method to provide a PEM composed of an intimate mixture of an ionomeric polymer and a structural film-forming polymer providing both strength and ionic conductivity.

In this application:

"ionomeric polymer" means a polymer containing ionic groups, such as a copolymer of an ionic monomer and a non-ionic monomer or a polymer treated (e.g., by sulfonation) so as to have ionic groups, which preferably demonstrates ionic conductivity (especially $H^+$ conductivity), including polymers such as Nafion™ and Flemion™;

"film-forming temperature" ($T_{ff}$) means the minimum temperature at which a polymer coalesces to form an essentially continuous film, which may be altered by the presence of a solvent, dispersant or suspendant, a plasticiser, or a coalescing aid such as glycerol; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

It is an advantage of the present invention to provide a strong, thin, durable and sufficiently conductive PEM for use in electrochemical cells such as fuel cells.

DETAILED DESCRIPTION OF PREFERRED EMBODIMENTS

The present invention provides ion conducting polymer electrolyte membranes (PEMs) comprising an intimate mixture of an ionomeric polymer and a structural film-forming polymer.

Film-forming polymers are polymers that form free-standing films upon removal of solvent/dispersant/suspendant from a solution/dispersion/suspension of the polymer at or above a certain temperature, which is the film-forming temperature ($T_{ff}$) of the polymer. Alternately, the solvent/dispersant/suspendant may be removed and the polymer may be subsequently heated to $T_{ff}$ or above. When heated above $T_{ff}$, separate particles of polymer material flow together and coalesce to form an essentially continuous material. Film-forming polymers are typically those that do not have high melting points (MP) or glass transition temperatures (Tg).

Film-forming polymers may be selected from polysulfones, polyvinyl halides, polyvinylidene fluoride copolymers, polytetrafluoroethylene copolymers, nylon 6, nylon 6,6, polyether sulfones, polyamides, polyetherphenylketones, polyimides, polyepoxy compounds, polycarbonates, substituted polystyrenes, poly-alpha-olefins, polyphenylene oxides and copolymers of (meth)acrylates. Film-forming polymers useful in the present invention are preferably fully or partially fluorinated. Since PEMs for use in electrochemical cells such as fuel cells cannot be electrically conductive, preferred structural and ionomeric film-forming polymers are not electrically conductive.

Structural film-forming polymers, preferably have a melting point of 180° C. or less, preferably 170° C., more preferably 160° C. or less and most preferably 140° C. or less. Structural film-forming polymers useful in the present invention should have a $T_{ff}$ no higher than the decomposition temperature of the ionomeric polymer. Film-forming structural polymers useful in the present invention preferably have a $T_{ff}$ of 180° C. or less, more preferably 160° C. or less, even more preferably 140° C. or less, and most preferably 120° C. or less. Where the ionomeric polymer is a film-forming polymer, the $T_{ff}$ of the structural film-forming polymer is preferably no more than 20° C. higher than the $T_{ff}$ of the ionomeric film-forming polymer and more preferably no higher than the $T_{ff}$ of the ionomeric film-forming polymer. More preferably, the $T_{ff}$ of the structural film-forming polymer is at least 15° C. less than the $T_{ff}$ of the ionomeric film-forming polymer and most preferably the $T_{ff}$ of the structural film-forming polymer is less than the $T_{ff}$ of the ionomeric film-forming polymer by 30° C. or more.

In their original state prior to incorporation into a film of the present invention, one or both of the polymers may be capable of crosslinking. The polymer may be capable of radiation crosslinking, such as by UV or by electron beam, or crosslinking by use of a crosslinking agent. The polymer may have crosslinkable functions which react during crosslinking.

Film-forming structural polymers useful in the present invention are preferably fluorinated. They may be fully or partially fluorinated, but preferably are partially fluorinated. While polytetrafluoroethylene (PTFE) is not a film-former, many copolymers of tetrafluoroethylene are useful. Many copolymers of vinylidenefluoride are useful. Preferred film-forming structural fluoropolymers include Fluorel™ (Dyneon Corp., Oakdale, Minn.) and the THV series of fluoropolymers polymers also available from Dyneon Corp. THV fluoropolymers are terpolymers of tetrafluoroethylene, hexafluoropropylene and vinylidene fluoride and thus are composed of —$CF_2CF_2$—, —$CH_2CF_2$—, and —$CF_2CF(CF_3)$— units.

Ionomeric polymers useful in the present invention are preferably film-forming polymers but may be non-film-forming polymers. Ionomeric polymers useful in the present invention may be fluorinated, including partially fluorinated and, more preferably, fully fluorinated. Ionomeric polymers useful in the present invention may contain pendant acid groups such as phosphonyl, more preferably carbonyl, and most preferably sulfonyl. Other fluorocarbon-type ionomeric polymers that can be useful in the invention comprise copolymers of olefins containing aryl perfluoroalkyl sulfonylimide cation-exchange groups, having the general formula (I): $CH_2$=CH—Ar—$SO_2$—$N^-$—$SO_2(C_{1+n}F_{3+2n}$ ), wherein n is 0–11, preferably 0–3, and most preferably 0, and wherein Ar is any substituted or unsubstituted divalent aryl group, preferably monocyclic and most preferably a divalent phenyl group, referred to as phenyl herein. Ar may include any substituted or unsubstituted aromatic moieties, including benzene, naphthalene, anthracene, phenanthrene, indene, fluorene, cyclopentadiene and pyrene, wherein the moieties are preferably molecular weight 400 or less and more preferably 100 or less. Ar may be substituted with any group as defined herein. One such resin is p-STSI, an ion conductive material derived from free radical polymerization of styrenyl trifluoromethyl sulfonylimide (STSI) having the formula (II): styrenyl-$SO_2N^-$—$SO_2CF_3$. Most preferably, the ionomeric polymer is a film-forming fluoropolymer having pendent sulfonic acid groups. Preferred film-forming ionomeric fluoropolymers include Nafion and Flemion™ (Asahi Glass Co. Ltd., Tokyo, Japan). Nafion is most preferred.

The PEM preferably contains the minimum amount of structural film-forming polymer necessary to provide the desired structural reinforcement. The PEM preferably contains at least 50 wt % ionomeric polymer, more preferably at least 65 wt %, even more preferably at least 80 wt %, and most preferably at least 90 wt %. Less structural polymer may be required where the processing conditions are chosen to provide a membrane wherein the structural polymer forms an essentially continuous phase.

The structural film-forming polymer may be composed of a combination of suitable film-forming polymers, and references herein to the structural film-forming polymer should be read to include possible mixtures of structural film-forming polymers. A single-component structural film-forming polymer is preferred. Likewise, the ionomeric polymer may be composed of a combination of suitable ionomeric polymers, and references herein to the ionomeric polymer should be read to include possible mixtures of ionomeric polymers. A single-component ionomeric polymer is preferred.

The intimate mixture that characterizes the composition of the PEM of the present invention contains intermixed domains of each polymer wherein one or both of the polymers is coalesced into a film. The coalesced morphology of the resulting film is therefore visibly different (upon microscopic inspection) from that resulting from mechanical combinations of two polymers, such as lamination or filling one polymer into a porous film of the second polymer. The coalesced morphology of the present invention has improved resistance to mechanical separation of the two polymers. Preferably, one or both polymers form an essentially continuous phase; most preferably both.

The PEM is advantageously thin, preferably having an average thickness of 50 μm or less and more preferably 30 μm or less.

In the completed film, one or both of the polymers may be crosslinked. Crosslinking may be by any suitable method, including use of a crosslinking agent, which may or may not make use of crosslinkable functions of the polymer, or use of radiation crosslinking, such as by UV or by electron beam, which also may or may not make use of crosslinkable functions of the polymer. Preferably, the structural polymer is crosslinked.

A method for the manufacture of the PEM of the present invention begins by making a mixed dispersion of the structural film-forming polymer and the ionomeric polymer. The polymers and dispersant may be mixed in any order, but typically each polymer is placed in a dispersion and the two dispersions thoroughly mixed by any suitable method. Any suitable dispersant may be used, but water, low alcohols (preferably C4 and under), and mixtures thereof are preferred. Water is most preferred. A surfactant such as Fluorad™ FC 94 fluorochemical surfactant (3M, St. Paul, Minn.) may be added. The surfactant remains dissolved in the dispersant and is later removed by rinsing the membrane. The method of the present invention may be performed with or without surfactant. Glycerol or other coalescing aids may be added to the dispersion, preferably in an amount of 0–10 wt %, more preferably about 5 wt %, based on polymer weight. Other coalescing aids may include DMSO, cyclohexanone, and other high-boiling ketones.

In a preferred embodiment of the present invention, the mixed dispersion is formed into a membrane by any suitable method, including casting or coating methods, including curtain coating, Meyer rod, knife coating, spin coating, slot coating, slide coating, knife coating, and roll coating. The membrane is then dried by any suitable method. The membrane may be dried with application of heat or may be dried and subsequently heated. The membrane is advantageously heated to at least the lowest $T_{ff}$ of the two polymers. Preferably the membrane is heated to above the higher of the two $T_{ff}$'s of the two polymers. The membrane is preferably heated to a temperature of no more than 180° C., more preferably no more than 160° C., even more preferably no more than 140° C., and most preferably no more than 120° C.

One or both of the polymers may be crosslinked. Preferably the structural polymer is crosslinked and not the ionomeric polymer. Crosslinking may be by any suitable method, including use of a crosslinking agent, which may or may not make use of crosslinkable functions of the polymer, or use of radiation crosslinking, such as by UV or by electron beam, which also may or may not make use of crosslinkable functions of the polymer. Crosslinking is preferably carried out after the membrane material is formed into a membrane. For each polymer, crosslinking is preferably carried out after coalescence of that polymer into a film.

One embodiment employs an ionomeric film-forming polymer and a crosslinkable structural film-forming polymer having a $T_{ff}$ less than the $T_{ff}$ of the ionomeric film-forming polymer, preferably by 15° C. or more, and more preferably by 30° C. or more. During or after formation into a membrane, the mixed polymer is heated to a temperature above the $T_{ff}$ of the structural film-forming polymer but less than the $T_{ff}$ of the ionomeric film-forming polymer to coalesce the structural film-forming polymer. The structural film-forming polymer is then crosslinked, preferably by radiation crosslinking. After crosslinking, the membrane is again heated, but to a higher temperature in excess of the $T_{ff}$ of the ionomeric film-forming polymer so as to coalesce the ionomeric film-forming polymer.

In further embodiment, the mixed dispersion may be dried prior to membrane formation and the dried mixture formed into a film by any suitable method, including extrusion or pressing methods such as rolling, flat platen pressing, and the like. The material may be heated as described above during or subsequent to pressing. One or both polymers may be crosslinked subsequent to pressing as described above.

The steps of drying the mixed dispersion, forming a membrane, coalescing each polymer and crosslinking each polymer may be carried out simultaneously or in any order, except that drying is preferably carried out prior to or simultaneously with any other step, crosslinking of either polymer is preferably carried out after forming into a membrane, and crosslinking of each polymer is preferably carried out after coalescing that polymer. Preferably, the structural polymer is coalesced, then crosslinked, and then the ionomeric polymer is coalesced.

Preferably, both polymers form an essentially continuous phase in the final membrane so as to provide both high strength and high ionic conductivity throughout the membrane. The conditions for providing a continuous phase are described with reference to Formula I:

$$\phi_a/\phi_b \times \eta_b/\eta_a = X \qquad \text{I}$$

where $\eta_a$ is the viscosity of the structural film-forming polymer, $\phi_a$ the volume fraction of structural film-forming polymer in the cast mixture, $\phi_b$ is the viscosity of the ionomeric polymer, and $\phi_b$ is the volume fraction of ionomeric polymer in the cast mixture. (See, e.g., Sperling, *Polymeric Multicomponent Materials*, p. 46–47 (John Wiley & Sons, 1997)). Optimally, the choice of polymers (including molecular weight and equivalent weight), the amount of polymers, and the choice of processing conditions (including temperature and the composition and amount of any solvent/dispersant/suspendant or coalescing aid) are made so that both polymers coalesce into an essentially continuous phase, either by simultaneous or step-wise coalescence. In simultaneous coalescence, these parameters are adjusted so that the mixture may be heated to the higher $T_{ff}$ (of the two polymers' $T_{ff}$'s) and X will equal 1, within a variation of 50%, more preferably 10%, and most preferably 5%. In step-wise coalescence, the above-listed parameters are adjusted so that the mixture may be heated to the $T_{ff}$ of the structural film-forming polymer and X will be greater than 1. Preferably the structural film-forming polymer is then crosslinked and the mixture is then heated to the $T_{ff}$ of the ionomeric polymer. Optimization of parameters may be accomplished by numerous methods, including adjusting the composition of either polymer, the molecular weight of either polymer, the equivalent weight of the ionomeric polymer, the composition and amount of any solvent/dispersant/suspendant, the composition and amount of any coalescing aid, or any other method known in the art.

An advantage of the present invention is that the acid form of the ionic polymer (e.g., sulfonic acid form) may be used throughout instead of the acid halide form (e.g., sulfonyl fluoride) typically used during the manufacture of a PEM. This obviates the need for a hydrolysis step, which typically requires highly basic conditions. Thus, the structural polymer need not be subjected to the hydrolysis of the acid halide form of the ionomeric polymer. This allows the use of base-sensitive structural polymers, which include many desirable film-formers such as partially-fluorinated film-forming copolymers, e.g. Fluorel and THV. The converse is also relevant. Most if not all of the fluoropolymers that can withstand the hydrolysis conditions (including PTFE, FEP, CTFE, ETFE and PVDF), melt above 180° C. and are not structural film-forming polymers as the term is used herein. Thus the ionomeric polymers used during the practice of the present invention may be limited to acid forms and acid halide forms may alternately be excluded.

The resulting membrane may be uniaxially or biaxially stretched to reduce thickness and alter physical characteristics. However, stretching of the membrane is not necessary and may alternately be excluded.

The PEM's of this invention are useful in MEA's for use in electrochemical cells such as fuel cells and sensors.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all chemicals and reagents were obtained or are available from Aldrich Chemical Co., Milwaukee, Wis. Examples designated with a "C" are comparative.

Ionic Conductivity Test Method

Conductivity measurements were made according to the method of T. Zawodzinski, et al., *J Phys. Chem.*, 1991 (95) 6040. Prior to measurement, each membrane was boiled in deionized water for 30 minutes, then fitted in a cell with the surface in contact with Pt electrodes. The cell was then submersed in water. The data were collected at 25° C. The ohmic (real) and capacitive (imaginary) components of the membrane impedance were measured by impedance spectroscopy at a frequency range of from 65 kHz to 0.1 Hz. A plot of imaginary vs. real impedance (Nyquist plot) generated a curve which was extrapolated to zero imaginary capacitance, where the ohmic resistance was measured. Conductivity in S/cm was calculated from the measured value of resistance, along with the cell constant and membrane thickness. All measurements were repeated at least three times and an average result is reported.

Water Absorption Test Method

Water absorption was determined by weighing dried samples, boiling the samples in de-ionized water for 30 min., then re-weighing. The weight of water absorbed is reported as a percent of the dry weight of the membrane.

Examples 1C and 2–4

Membranes of the invention were prepared as follows: dispersions of Nafion™ ionomers (Nafion SE 10872 (10% solids dispersed in water, 800 Equivalent Weight (EW)), SE 10172 (11% solids dispersed in water, 1100 EW), and Nafion SE 5012 (5% solids dispersed in alcohol, 1000 EW); DuPont Chemical Co., Wilmington, Del.), were mixed with THV 230R™, (Dyneon Corp., Oakdale, Minn.), a 35% solids dispersion of THV 200 (a terpolymer of approximately 40% tetrafluoroethylene, 40% vinylidene fluoride, and 20% hexafluoropropylene). Glycerol (5 wt % based on polymer) was added to the dispersion as a coalescing aid. In Ex. 2, a surfactant (Fluorad FC 94 fluorochemical surfactant, 3M, St. Paul, Minn.) was added to stabilize the dispersion. The resulting mixed dispersions were knife coated on a glass plate and dried under nitrogen for 10 min. at about 80° C., then heated to about 140° C. for 5 to 10 min. to coalesce the film. The cooled, coated glass was submerged in water to release the film. The films were prepared with a thickness of about 0.025 mm. The films were boiled in water, soaked in an aqueous solution comprising 25% v/v conc. $HNO_3$ and 1% v/v $H_2O_2$ at 50° C. for about ½hour, then repeatedly boiled in Millipore-filtered deionized water until the pH was stable. Total membrane EW was calculated from the ratios of the constituents. Ionic conductivity, water absorption, and total membrane EW are shown in Table I, following.

TABLE I

| | Composition | | | Ionic | | Total |
|---|---|---|---|---|---|---|
| Ex. | Nafion EW | wt % Nafion | wt % THV | Conductivity (mS/cm) | $H_2O$ Absorption | Membrane EW |
| 1C | 1100 | 100 | 0 | 150 | 30% | 1100 |
| 2 | 1100 | 77.5 | 22.5 | 147 | 20% | 1420 |
| 3 | 800 | 50 | 50 | 50 | 80% | 1600 |
| 4 | 800 | 60 | 40 | 56 | 100% | 1330 |
| 5 | 800 | 70 | 30 | | 110% | 1140 |
| 6 | 1000 | 50 | 50 | 40 | 10% | 2000 |
| 7 | 1000 | 75 | 25 | 47 | | 1330 |

Casting of additional films from Nafion SE 10872 (800 EW) was attempted under the conditions specified above. Films cast from the 800 EW Nafion alone fell apart in boiling water after a few minutes. For this Nafion, addition of at least 30% THV was required to give films with sufficient mechanical strength to withstand subsequent handling and testing.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A polymer electrolyte membrane comprising an intimate mixture of at least one ionomeric polymer and at least one structural film-forming polymer wherein the ionomeric polymer is a film-forming polymer and wherein the structural film-forming polymer has a $T_{ff}$ less than the $T_{ff}$ of the ionomeric polymer.

2. A polymer electrolyte membrane comprising an intimate mixture of at least one ionomeric polymer and at least one structural film-forming polymer wherein the ionomeric polymer is a film-forming polymer and wherein the structural film-forming polymer has a $T_{ff}$ less than the $T_{ff}$ of the ionomeric polymer by 15° C. or more.

3. A polymer electrolyte membrane comprising an intimate mixture of at least one ionomeric polymer and at least one structural film-forming polymer, wherein the structural film-forming polymer is an essentially continuous phase, wherein the ionomeric polymer is a film-forming polymer and wherein the structural film-forming polymer has a $T_{ff}$ less than the $T_{ff}$ of the ionomeric polymer.

4. A polymer electrolyte membrane comprising an intimate mixture of at least one ionomeric polymer and at least one structural film-forming polymer, wherein the structural film-forming polymer is an essentially continuous phase, wherein the ionomeric polymer is a film-forming polymer and wherein the structural film-forming polymer has a $T_{ff}$ less than the $T_{ff}$ of the ionomeric polymer by 15° C. or more.

5. A method of making a polymer electrolyte membrane comprising the steps of:
   a) providing a mixture of a dispersion of at least one ionomeric polymer and a dispersion of at least one structural film-forming polymer; and
   b) coalescing at least one of said polymers into an essentially continuous phase.

6. The method of making a polymer electrolyte membrane according to claim 5 comprising the step of coalescing the structural film-forming polymer.

7. The method of making a polymer electrolyte membrane according to claim 5 wherein said dispersion is a dispersion in one or more liquids selected from the group consisting of water, methanol, ethanol, propanol, isopropanol, butanol and isobutanol.

8. The method of making a polymer electrolyte membrane according to claim 5 further comprising the step of casting and drying said dispersion to form a cast mixture.

9. The method of making a polymer electrolyte membrane according to claim 8 further comprising the step of heating said cast mixture to at least the $T_{ff}$ of the structural film-forming polymer.

10. The method of making a polymer electrolyte membrane according to claim 9 further comprising the step of crosslinking the structural film-forming polymer.

11. The method of making a polymer electrolyte membrane according to claim 8, wherein the ionomeric polymer is a ionomeric film-forming polymer, further comprising the step of heating said cast mixture to at least the $T_{ff}$ of the ionomeric film-forming polymer.

12. The method of making a polymer electrolyte membrane according to claim 9 further comprising the step of crosslinking the ionomeric film-forming polymer.

13. The method of making a polymer electrolyte membrane according to claim 5 further comprising the step of at least partially drying said dispersion to form a cast mixture and subsequently forming said cast mixture into a membrane.

14. The method of making a polymer electrolyte membrane according to claim 13 wherein said forming step comprises extrusion.

15. The method of making a polymer electrolyte membrane according to claim 13 wherein said forming step comprises pressing.

16. The method of making a polymer electrolyte membrane according to claim 13 further comprising the step of heating said cast mixture to at least the $T_{ff}$ of the structural film-forming polymer.

17. The method of making a polymer electrolyte membrane according to claim 16 further comprising the step of crosslinking the structural film-forming polymer.

18. The method of making a polymer electrolyte membrane according to claim 13, wherein the ionomeric polymer is a ionomeric film-forming polymer, further comprising the step of heating said cast mixture to at least the $T_{ff}$ of the ionomeric film-forming polymer.

19. The method of making a polymer electrolyte membrane according to claim 18 further comprising the step of crosslinking the ionomeric film-forming polymer.

20. A method of making a polymer electrolyte membrane comprising the steps of:
   a) providing a dispersion of at least one ionomeric polymer and at least one structural film-forming polymer;
   b) casting and drying said dispersion to form a cast mixture;
   c) simultaneously or subsequently adjusting the temperature of said cast mixture to at least the $T_{ff}$ of the structural film-forming polymer to coalesce the structural film-forming polymer; and
   d) simultaneously or subsequently crosslinking the structural film-forming polymer.

21. The method of making a polymer electrolyte membrane according to claim 20 wherein the ionomeric polymer is a ionomeric film-forming polymer and wherein the structural film-forming polymer has a $T_{ff}$ less than the $T_{ff}$ of the ionomeric film-forming polymer, comprising the additional step of:
   e) subsequently adjusting the temperature of said cast mixture to at least the $T_{ff}$ of the ionomeric film-forming polymer.

22. The method of making a polymer electrolyte membrane according to claim 20, wherein, during coalescence of the structural film-forming polymer, the viscosity of the structural film-forming polymer ($\eta_a$), the volume fraction of structural film-forming polymer in the cast mixture ($\phi_a$), the viscosity of the ionomeric polymer ($\eta_b$), and the volume fraction of ionomeric polymer in the cast mixture ($\phi_b$), satisfy Formula II:

$$\phi_a/\phi_b \times \eta_b/\eta_a = 1 \qquad \text{II}$$

within a variation of no more than 50%.

23. The method of making a polymer electrolyte membrane according to claim 22, wherein the variation is no more than 10%.

24. The method of making a polymer electrolyte membrane according to claim 20, wherein, during coalescence of the structural film-forming polymer, the viscosity of the structural film-forming polymer ($\eta_a$), the volume fraction of structural film-forming polymer in the cast mixture ($\phi_a$), the viscosity of the ionomeric polymer ($\eta_b$), and the volume fraction of ionomeric polymer in the cast mixture ($\phi_b$), satisfy Formula III:

$$\phi_a/\phi_b \times \eta_b/\eta_a > 1. \qquad \text{III}$$

* * * * *

UNITED STATES PATENT AND TRADEMARK OFFICE
CERTIFICATE OF CORRECTION

PATENT NO. : 6,277,512 B1  Page 1 of 1
DATED : August 21, 2001
INVENTOR(S) : Hamrock, Steven J.

It is certified that error appears in the above-identified patent and that said Letters Patent is hereby corrected as shown below:

Column 5,
Line 50, insert -- is -- after "$\phi_a$".
Line 50, "$\phi_b$" should read -- $\eta_b$ --.

Signed and Sealed this

Twenty-sixth Day of August, 2003

JAMES E. ROGAN
*Director of the United States Patent and Trademark Office*